(12) United States Patent
Drnevich et al.

(10) Patent No.: US 7,037,485 B1
(45) Date of Patent: May 2, 2006

(54) STEAM METHANE REFORMING METHOD

(75) Inventors: Raymond Francis Drnevich, Clarence Center, NY (US); Vasilis Papavassiliou, Williamsville, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 11/151,223

(22) Filed: Jun. 14, 2005

Related U.S. Application Data (63) Continuation-in-part of application No. 10/990,485, filed on Nov. 18, 2004, now abandoned.

(51) Int. Cl.
*C01B 3/00* (2006.01)
*C01B 3/32* (2006.01)
*C01B 17/16* (2006.01)

(52) U.S. Cl. ............... 423/652; 423/242.1; 423/418.2; 423/564; 423/650; 423/651; 423/653; 423/654; 252/373

(58) Field of Classification Search ............... 252/373; 423/242.1, 418.2, 564, 650, 651, 652, 653, 423/654
See application file for complete search history.

(56) References Cited

U.S. PATENT DOCUMENTS

| | | | |
|---|---|---|---|
| 5,720,901 A | 2/1998 | De Jong et al. | ............. 252/373 |
| 5,958,297 A * | 9/1999 | Primdahl | ................... 252/373 |
| 6,730,285 B1 * | 5/2004 | Aasberg-Petersen et al. | ............. 423/652 |
| 6,887,455 B1 * | 5/2005 | Carpenter et al. | ....... 423/648.1 |
| 6,911,193 B1 * | 6/2005 | Allison et al. | .............. 423/651 |
| 2003/0073788 A1 | 4/2003 | Golden et al. | ................ 526/72 |
| 2004/0156778 A1 | 8/2004 | Hwang et al. | .............. 423/651 |
| 2004/0241086 A1 * | 12/2004 | Van Dongen et al. | ...... 423/651 |

OTHER PUBLICATIONS

Reyes et al., "Evolution Of Processes For Synthesis Gas Production: Recent Developments In An Old Technology", Ind. Eng. Chem Res. (2003) pp 1588-1597.
Kramer et al., "Flexible Hydrogen Plant Utilizing Multiple Refinery Hydrocarbon Streams", NPRA Annual Meeting (1996).

(Continued)

*Primary Examiner*—Ngoc-Yen Nguyen
*Assistant Examiner*—Timothy C. Vanoy
(74) *Attorney, Agent, or Firm*—David M. Rosenblum (57) ABSTRACT

A steam methane reforming method in which a feed stream is treated in a reactor containing a catalyst that is capable of promoting both hydrogenation and partial oxidation reactions. The reactor is either operated in a catalytic hydrogenation mode to convert olefins into saturated hydrocarbons and/or to chemically reduce sulfur species to hydrogen sulfide or a catalytic oxidative mode utilizing oxygen and steam to prereform the feed and thus, increase the hydrogen content of a synthesis gas produced by a steam methane reformer. The method is applicable to the treatment of feed streams containing at least 15% by volume of hydrocarbons with two or more carbon atoms and/or 3% by volume of olefins, such as a refinery off-gas. In such case, the catalytic oxidative mode is conducted with a steam to carbon ratio of less than 0.5, an oxygen to carbon ratio of less than 0.25 and a reaction temperature of between about 500° C. and about 860° C. to limit the feed to the steam methane reformer to volumetric dry concentrations of less than about 0.5% for the olefins and less than about 10% for alkanes with two or more carbon atoms.

16 Claims, 3 Drawing Sheets

OTHER PUBLICATIONS

Huff et al., "Partial Oxidation of Alkanes Over Nobel Metal Coated Monoliths", Catalysis Today 21 (1994) pp 113-128.

Chlapik et al., "Alterative Lower Cost Feedstock For Hydrogen Production", NPRA Annual Meeting (1994).

* cited by examiner

STEAM METHANE REFORMING METHOD

RELATED APPLICATIONS

The present application is a continuation-in-part of U.S. patent application Ser. No. 10/990,485, filed Nov. 18, 2004, now abandoned.

FIELD OF THE INVENTION

The present invention relates to a steam methane reforming method in which a hydrocarbon feed stream containing methane and/or hydrocarbons with two or more carbon atoms is converted into an intermediate product within a catalytic reactor and the intermediate product is subsequently reformed in a steam methane reformer to in turn produce a synthesis gas product. More particularly, the present invention relates to such a method in which the catalytic reactor is capable of operating in either a mode involving the hydrogenation of hydrocarbons and sulfur compounds into saturated hydrocarbons and hydrogen sulfide or an alternative mode involving the use of oxygen to produce additional hydrogen.

BACKGROUND OF THE INVENTION

In a typical steam methane reformer operation for the production of hydrogen, natural gas is pretreated to remove sulfur. This is accomplished by hydrogenation of organic sulfur within a hydrotreater, which converts the organic sulfur to hydrogen sulfide, followed by hydrogen sulfide removal in a chemisorbent bed, utilizing, for example, a zinc oxide sorbent. The desulfurized feed is then mixed with steam and reformed in the steam methane reformer to produce a synthesis gas stream containing hydrogen and carbon monoxide. Such a synthesis gas stream can be further processed to produce hydrogen.

Steam methane reforming installations are relatively inflexible with respect to the variability in the amount of hydrogen produced and the type of feeds that can be processed and ultimately reformed. The amount of hydrogen produced is normally set by the plant design. For most plants the amount of hydrogen produced can only be decreased from normal production by cutting back on the flow rate of reactants and the firing rate. The feed to a steam methane reforming installation is normally natural gas. It is, however, desirable to process hydrocarbon streams containing hydrocarbons with more than two carbon atoms within a steam methane reformer. A common source for these hydrocarbon streams include by-product streams of refineries, chemical production facilities and metal producing operations. In many cases these streams have a high olefin content.

A variety of off-gas streams are produced in refineries from processes such as fluidic catalytic cracking, coking, catalytic reforming, hydrocracking and etc. Generally, all of these streams are used for fuel in furnaces and for making steam. Many refineries produce more of such fuel gas than they can economically use. Since these streams have a high hydrocarbon and generally, a moderate hydrogen content, they potentially could be reformed to produce synthesis gases that in turn are used to produce hydrogen. Hydrogen is a more valuable commodity than either fuel or steam. As indicated above, however, such feeds have a high olefin content and a high content of other hydrocarbons with more than two carbon atoms which makes treatment within the conventional hydrotreater problematical. Additionally, such streams tend to form carbon on the catalyst within the steam methane reformer causing eventual loss of activity of the reforming catalyst.

New hydrogen production facilities can be designed to utilize streams with high olefin content or high content of other hydrocarbons with more than two carbon atoms. In such facilities, the hydrotreater is designed to hydrogenate olefins to alkanes and a prereformer converts the other hydrocarbons with more than two carbon atoms to methane, carbon monoxide and hydrogen.

In an existing hydrogen production facility complicated modifications are necessary to allow utilization of streams with high olefin content and high content of other hydrocarbons with more than two carbon atoms. The existing hydrotreater will likely need to be replaced and a prereformer will be required to function in a manner set forth above. The new hydrotreater will likely require a larger reactor with a more expensive catalyst and possibly a means of diluting the hydrotreater feed, for example, by recycling part of the hydrotreater effluent. Adding a prereformer upstream of an existing steam methane reformer requires modifications to the existing primary reformer to add heat exchanging tubes for preheating the fuel feed to the prereformer and a prereformer reactor. The modifications to the existing reformer are costly and require shut down of the reformer for an extended period of time. The steam production will also decrease since some of the heat that was used to produce steam is now required for the prereformer. All these modifications are costly and in addition, the disruption to the reformer operation make such modifications to existing reformers very difficult to justify on an economic basis.

The hydrotreater even when replaced with one capable of processing olefins is nevertheless limited in the concentration of olefins that can be treated. The hydrogenation reaction is exothermic and excess olefins can cause an undesirable temperature rise. The hydrogenation catalyst is typically a nickel molybdenum or cobalt molybdenum based catalyst. The hydrogenation catalyst has an operating window from about 260° C. to about 415° C. Below 260° C. the catalytic reaction is very slow and above 415° C. the catalyst looses activity quickly. Due to reaction rate and such temperature limitations, space velocities that are greater than about 4000 $hr^{-1}$ are too high for effective olefins reduction. Furthermore, each 1% by volume of olefins in the feed gas results in about a 40° C. temperature rise. Given the limited temperature operating window the usefulness of the hydrotreater has been limited to hydrocarbon feeds with less than about 5% olefins and low variability in olefin content. In any event, hydrotreaters are large, expensive devices when used to process any type of hydrocarbon feed that contain significant quantities of olefins.

The prereformer that would be used to treat higher order hydrocarbons also has operational limitations. Prereformers are generally adiabatic catalytic reactors that treat the incoming feed by converting the higher order hydrocarbons and some methane into hydrogen, carbon monoxide, water and carbon dioxide. In such manner, higher order hydrocarbons present within the feed are prevented from thermally cracking and producing a carbon deposit on the catalyst within the steam methane reformer. The prereformer catalyst is a nickel based catalyst that is more active and more expensive than the typical reformer catalyst and is also more sensitive to process upsets. For example overheating can result in activity loss so the feed conditions to the prereformer must be carefully controlled. The prereformer catalyst cannot accept olefin containing feed streams and it is typically positioned after the hydrotreater and sulfur removal unit. The prereforming catalyst has a shorter lifetime than the reforming catalyst and therefore requires additional plant shut downs for catalyst replacement.

Steam methane reformers can be designed to handle hydrocarbon feed containing alkanes with more than two carbon atoms with the use of an alkalized catalyst or with a high steam to carbon ratio. The alkali in such catalyst, however, can migrate and foul downstream equipment and the increased steam to carbon ratio reduces the plant energy efficiency.

It has been proposed to reform streams having a high olefin content by catalytic partial oxidation. In U.S. Patent Application 2004/0156778 a hydrogen-rich reformate is generated from a hydrocarbon feed stream comprising olefins and alkanes, for instance, liquefied propane gas. In the process disclosed in this patent application, the hydrocarbon feed stream comprising olefins and alkanes is pretreated by catalytic partial oxidation. The feed stream is fed to the catalytic partial oxidation reactor at a temperature of less than 300° C. and the temperature of the resultant gas stream is maintained below 400° C. These low temperatures are specifically required by the type of streams that are contemplated being processed in this patent, namely streams with a high propane content and relatively low olefin content. According to the patent at higher temperature, under the feed conditions defined in the patent, the propane in such streams will tend to decompose into olefins, propylene and ethylene, to add to the olefin content of such streams.

If refinery off-gases were treated by the process disclosed above, the olefin content would not be sufficiently reduced and the other hydrocarbons with two or more carbon atoms would still be problematical. In any event, with respect to existing steam methane reformers, the high olefin and other hydrocarbons with more than two carbon atoms present within such off-gases as have been discussed above will deactivate the reforming catalyst through coking. As such, the process disclosed in this patent does not present an alternative for treating such off-gases.

A catalytic partial oxidation process can be used to substantially convert such off-gases to a carbon monoxide and hydrogen containing synthesis gas. However such process will require significantly more oxygen, which is expensive, and if added as pretreatment system for a steam methane reformer, adds significantly in the cost of making hydrogen. For example, U.S. Pat. No. 5,720,901 discloses a process for producing a synthesis gas by partial oxidation of hydrocarbons having from 1 to 5 carbon atoms in which oxygen is added to the feed at an oxygen to carbon ratio that ranges between 0.3 to 0.8 and optionally steam at a steam to carbon ratio that ranges from 0.0 to 3.0. The process is conducted at a temperature of at least 950° C. In the process of this patent, sulfur containing compounds such as hydrogen sulfide, carbonyl sulfide, carbon disulfide, thiophenes, mercaptans and sulfides are a desirable component of the feed to be treated in that such compounds reduce the formation of ammonia and hydrogen cyanide. Such sulfur compounds will be converted into hydrogen sulfide which can be removed by a desulfurization unit, for example, one containing zinc oxide, to produce a synthesis gas product that can be supplied to a sulfur-sensitive application such as Fischer-Tropsch.

As will be discussed, the present invention provides a method of steam methane reforming to produce a synthesis gas utilizing a dual mode catalytic reactor, which is defined here as a catalytic reactor that with the same catalyst can function in an oxygen consuming catalytic oxidative mode of operation to pre-treat hydrocarbon containing feeds to the steam methane reformer to increase hydrogen output or can be used in a catalytic hydrogenation mode of operation with no consumption of oxygen to pre-treat feeds by converting olefins into saturated hydrocarbons. In both modes of operation, sulfur compounds will be chemically reduced to hydrogen sulfide so as to not require the use of a conventional hydrotreater in at least new installations. Such method has particular applicability to the treatment of feeds of refinery off-gases and like compositions containing objectionable levels of hydrocarbons so that such feed can be used with a conventional steam methane reformer designed for natural gas feed.

SUMMARY OF THE INVENTION

The present invention provides a steam methane reforming method in which a feed stream comprising olefins and hydrogen is heated to a temperature of no greater than about 600° C. The hydrogen and the olefins within the feed stream are contacted with a catalyst capable of promoting both hydrogenation and partial oxidation reactions and are catalytically reacted without oxygen to produce an intermediate product stream containing saturated hydrocarbons formed from the hydrogenation of the olefins. The heating of the feed stream being sufficient and/or the olefins being present within the feed stream in a sufficient amount that the intermediate product stream is produced at a temperature of greater than about 400° C. This temperature is necessary for the catalytic reactions to proceed. A reformer feed stream, formed at least in part by the intermediate product stream and a steam stream, is reacted in a steam methane reformer to obtain a synthesis gas product stream containing hydrogen, carbon monoxide, water and carbon dioxide. The catalytic reaction of the hydrogen and the olefins is conducted within a reactor containing the catalyst at a space velocity of greater than about 10,000 $hr^{-1}$ and with a sufficient amount of hydrogen that the reformer feed stream has and an olefin content less than about 0.5% of olefins by volume on a dry basis.

Olefins tend to deactivate catalysts utilized in steam methane reformers and hence, their conversion to saturated hydrocarbons, as described above, allow feed streams having a high concentration of olefins to be treated. Refinery off-gases can contain olefins at a concentration of greater than about 3% by volume on a dry basis and the method of the present invention has particular application in being able to treat and reform such feeds. Various sulfur compounds constitute another catalyst poison. Where the feed stream contains sulfur compounds, the hydrogen can also be reacted with the sulfur compounds during the catalytic reaction such that the intermediate product stream also contains hydrogen sulfide formed from the hydrogenation of the sulfur compounds. The intermediate product stream can then be cooled and treated to remove the hydrogen sulfide such that the intermediate product stream contains no more than about 0.1 ppm hydrogen sulfide after having been treated. The reformer feed stream can then be formed at least in part by the intermediate product stream after having been treated. It is to be noted that the catalytic reaction contemplated by the aforesaid mode of operation is a net exothermic catalytic process in which hydrogen and unsaturated hydrocarbons are combined in an addition reaction to produce saturated hydrocarbons and/or to chemically reduce sulfur compounds to hydrogen sulfide. Steam may be added in such a mode of operation so that reforming to a limited degree occurs and temperatures are moderated. It is to be further pointed out that the hydrogen within the feed can be that which is naturally present or is added through recirculation of product as may be necessary to support the required hydrogenation reaction.

As may be appreciated by those skilled in the art, the present invention contemplates a reactor operating at a space velocity of 5 to 50 times that of a conventional hydrotreater and therefore, such reactor can be a smaller and less expensive unit than a hydrotreater utilizing a conventional hydrotreater catalyst. Therefore, the application of the present invention to a steam methane reformer is more cost effective than obtaining a conventional hydrotreater when streams containing olefins and/or sulfur are to be treated. It is also to be noted that since higher operational temperatures are possible, much higher concentrations of olefins are able to be treated.

As indicated above, the present invention has particular application to the treatment of refinery off-gas streams and the like. In a specific aspect of the present invention, a feed stream that comprises no less than about 15% by volume on a dry basis of hydrocarbons with at least two carbon atoms and/or at least about 3% by volume of olefins is heated to a temperature of no greater than about 600° C. Either of such hydrocarbon content could prevent the reforming of the feed in a steam methane reformer designed for natural gas. In this regard, although higher order hydrocarbons might be tolerated through adjustment of the steam to carbon ratio, olefins cannot be tolerated. The hydrocarbons and/or olefins, and also, steam and oxygen are contacted with a catalyst capable of promoting both hydrogenation and partial oxidation reactions and are catalytically reacted at an oxygen to carbon ratio of less than about 0.25 and a steam to carbon ratio of less than about 0.5 to produce an intermediate product stream.

It is to be noted that the catalytic reaction contemplated by the foregoing mode of operation of the present invention is a net exothermic catalytic process conducted with the addition of the oxygen and steam and in which the hydrocarbon content of the feed is partially oxidized and partially reformed and any sulfur content tends to be chemically reduced to hydrogen sulfide. The intermediate product stream thus contains hydrocarbons that are subsequently reformed by steam methane reforming within the steam methane reformer.

A reformer feed stream, formed, at least in part, with the intermediate product stream, and a steam stream is reacted in a steam methane reformer to obtain a synthesis gas product stream containing hydrogen, carbon monoxide, water and carbon dioxide. The catalytic reaction is conducted within a reactor containing the catalyst at a space velocity greater than about 10,000 $hr^{-1}$ and with a sufficient amount of oxygen that the intermediate product stream is produced at a temperature of between about 500° C. and 860° C. The oxygen to carbon and the steam to carbon ratio is selected such that the reformer feed stream has a hydrocarbon content consisting of methane, less than about 0.5% of olefins by volume on a dry basis, less than about 10% of alkanes with two or more carbon atoms by volume on a dry basis, no more than about 1% by volume on a dry basis of hydrocarbons other than alkanes and olefins and a remaining content comprising hydrogen, carbon monoxide, carbon dioxide and water vapor.

When the hydrocarbon containing feed stream is treated at the conditions set forth above, the olefins and other hydrocarbons with more than two carbon atoms are decomposed into methane, carbon monoxide, hydrogen, carbon dioxide and water. Since the resultant reformer feed stream has a content of alkanes with two or more carbon atoms that is less than about 10% by volume and an olefin content of less than about 0.5% by volume, the resultant stream has a hydrocarbon makeup that can be further processed in a conventional manner by steam methane reforming. The conventional teaching of the prior art is that alkanes will be converted to olefins at temperatures above 400° C. The inventors have found that, surprisingly, with a very low steam content, such conversion at temperature will not take place. In this regard, just enough water is added so that the intermediate product contains a sufficiently low water content as not to interfere with downstream sulfur removal if required. Furthermore, the addition of more water will require more oxygen to maintain the reaction at temperature.

In yet a further aspect, the present invention provides a steam methane reforming method in which the hydrogen content of the reformed product stream can be economically adjusted by operating in either the hydrogenation mode selected for lower hydrogen production or oxidative mode selected for higher hydrogen production. Alternatively the oxidation mode can be selected in order to reduce the firing rate of the steam methane reformer when producing a constant quantity of hydrogen, or in other words the amount of fuel consumed thereby can be cut back. The conventional hydrotreater can be eliminated. In such aspect of the invention, a feed stream that comprises hydrocarbons, sulfur compounds and hydrogen is heated to a temperature of no greater than about 600° C. An intermediate product stream is produced by catalytically reacting the hydrogen with the hydrocarbons and the sulfur compounds without oxygen. As a result, the intermediate product stream contains saturated hydrocarbons and hydrogen sulfide formed from hydrogenation of the hydrocarbons and the sulfur compounds, respectively. The heating of the feed stream and/or the hydrogenation of the hydrocarbons being sufficient to produce the intermediate product stream at a temperature of greater than about 400° C.

Alternatively, oxygen, steam and the hydrocarbons, hydrogen and the sulfur compounds are catalytically reacted so that the intermediate product stream contains additional hydrogen and carbon monoxide produced by reaction of the oxygen, steam and hydrocarbons and hydrogen sulfide produced by conversion of the sulfur compounds. The oxygen is present in a sufficient amount that the intermediate product stream is produced at a temperature of between about 500° C. and about 860° C. and the steam to carbon and oxygen to carbon ratios are selected to control the amount of moles of the additional hydrogen produced and at less than about 0.5 and less than about 0.25, respectively. The catalytic reactions of the hydrogen, hydrocarbons and the sulfur compounds or alternatively of the oxygen, steam, hydrocarbons and sulfur compounds are conducted through contact with a catalyst capable of promoting both hydrogenation and partial oxidation reactions within a reactor that is the same for both of the catalytic reactions. The catalytic reactions are each conducted at a space velocity greater than about 10,000 $hr^{-1}$.

The intermediate product stream is cooled and treated by removal of the hydrogen sulfide and such that the intermediate product stream contains no more than about 0.1 ppm hydrogen sulfide after having been treated.

A reformer feed stream, formed at least in part by the intermediate product stream and a steam stream, is reacted in a steam methane reformer to obtain a synthesis gas product stream having more moles of hydrogen than that of the feed stream and the intermediate product stream and also containing carbon monoxide, water and carbon dioxide.

In the aforesaid aspect of the present invention, refinery off-gases and the like can be treated and as such, the feed stream can contain no less than about 15% by volume on a dry basis of hydrocarbons with at least two carbon atoms and/or at least about 3% by volume of olefins.

During the catalytic reaction of the hydrogen, the hydrocarbon and the sulfur compounds, the hydrogen reacts with any olefins present within the feed stream to also produce saturated hydrocarbons and there exists sufficient hydrogen to obtain an olefin content within the reformer feed stream that is less than about 0.5% by volume on a dry basis. The catalytic reaction of the oxygen, steam, hydrocarbons and sulfur compounds is conducted with the oxygen to carbon and steam to carbon ratio selected so that a hydrocarbon content consisting of methane, less than about 0.5% of olefins by volume on a dry basis, less than about 10% of alkanes with two or more carbon atoms on a dry basis and no more than about 1% by volume on a dry basis of hydrocarbons other than alkanes and olefins is obtained in the reformer feed stream.

In the foregoing two aspects of the present invention during both of the catalytic reactions, the steam methane reformer can be operated at a firing rate that remains substantially unchanged. As a result, the additional hydrogen produced during the catalytic reaction of the oxygen, steam, hydrocarbons and sulfur compounds increases the moles of synthesis gas product stream and the hydrogen production rate over that produced when the hydrogen, hydrocarbons and sulfur compounds are catalytically reacted without adding oxygen. In an alternative operation, during the catalytic reaction of the oxygen, steam, hydrocarbons and sulfur compounds, the steam methane reformer is operated at a lower firing rate than during the catalytic reaction of the hydrogen, hydrocarbons and sulfur compounds. This allows for reduced fuel usage to the steam methane reformer and with of course, a lower total product synthesis gas and hydrogen production rate than when the steam methane reformer is operated at constant firing. The steam production rate can be equivalent to that obtained during the hydrogenation mode.

In any embodiment of the present invention involving the catalytic hydrogenation mode of operation, steam may be introduced into the reactor to engage in reforming reactions with the hydrocarbons. Furthermore, in any embodiment of the present invention, hydrogen can be added to a natural gas stream to allow the natural gas stream to be treated by hydrogenating the sulfur compounds contained therein into hydrogen sulfide and then removing the hydrogen sulfide so that the natural gas stream contains less than about 0.1 ppm by volume on a dry basis of hydrogen sulfide. The reformer feed stream is formed in part by combining the natural gas stream with the intermediate product stream. Alternatively, the feed stream can further comprise natural gas. For example, a natural gas stream can be combined with a refinery off-gas stream and the resulting combined stream can be treated in the reactor to reduce olefins and/or higher order hydrocarbons and sulfur compounds to hydrogen sulfide. As may be appreciated, such embodiment of the present invention would not require an expensive and large hydrotreater.

In cases in which the feed stream contains no less than about 15% by volume on a dry basis of hydrocarbons with at least two carbon atoms and/or at least about 3% by volume of olefins, such feed stream can be an FCC off-gas, a coker off-gas or a sweet refinery gas.

Preferably in any embodiment of the present invention, the feed stream is compressed to a pressure of between about 5 psi and about 100 psi above operating pressure of the steam methane reformer. The feed stream preferably has a sulfur content of less than about 50 ppm.

In any embodiment of the present invention, the reactor preferably contains a Group VIII catalyst supported on a metallic monolith.

The intermediate product stream can be treated for sulfur removal by being contacted with a zinc oxide or copper oxide sorbent.

BRIEF DESCRIPTION OF THE DRAWING

While the specification concludes with claims distinctly pointing out the subject matter that Applicants regard as their invention it is believed that the invention will be better understood when taken in connection with the accompanying drawings in which:

DETAILED DESCRIPTION

Figure 1:
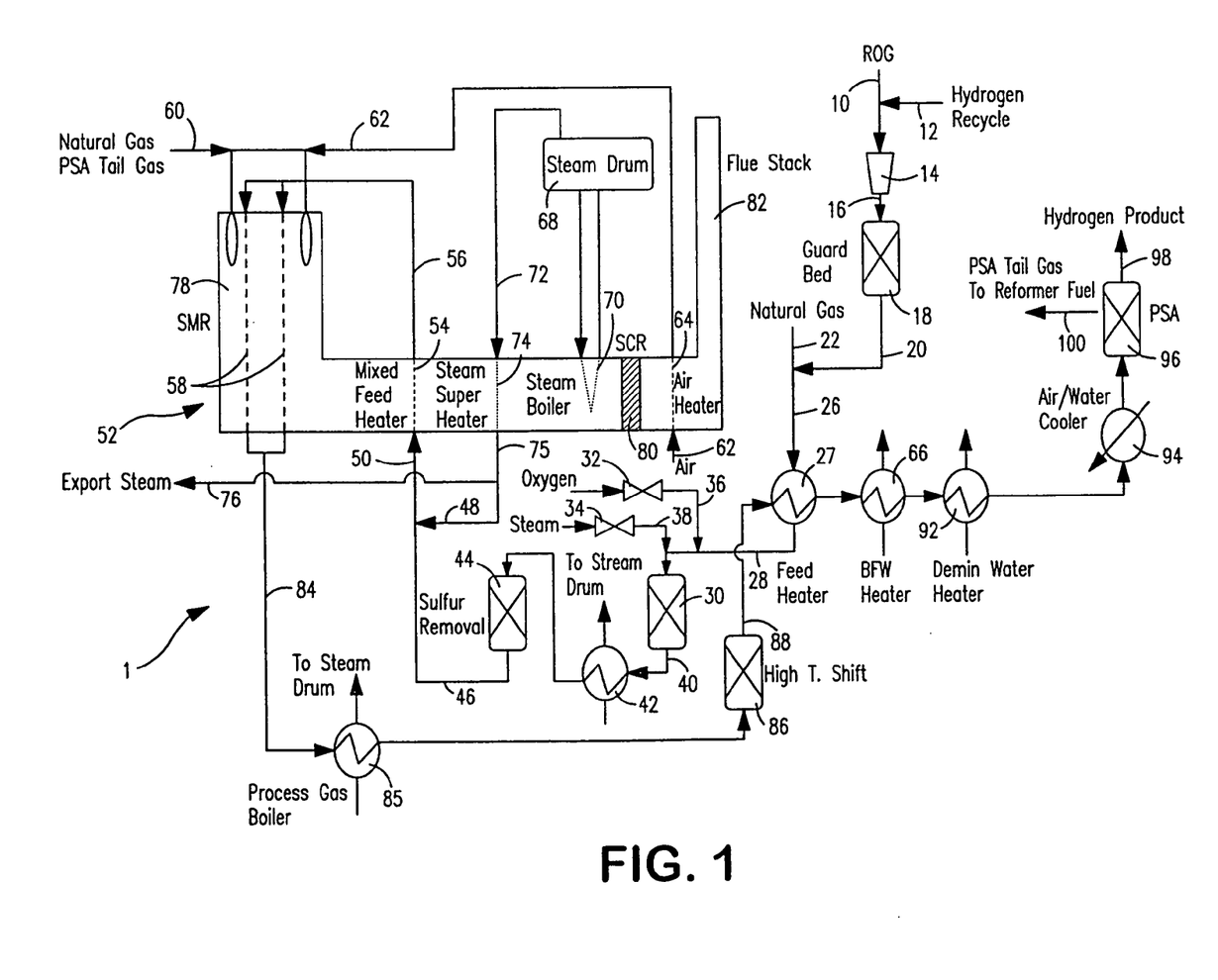
FIG. 1 illustrates a schematic of an apparatus for carrying out a method in accordance with the present invention in which a refinery off-gas and natural gas are treated together and subsequently reformed.

With reference to FIG. 1, an apparatus 1 is illustrated for carrying a method in accordance with the present invention. Apparatus 1 illustrates the integration of the present invention into a conventional steam methane reforming process to treat refinery off-gases and/or natural gas. In this regard, although the refinery off-gases in FIG. 1 are used in such process to partially replace natural gas as feed to reformer, it is understood that the present invention can be conducted with the object of solely reforming such refinery off-gases or any other gas stream as described above in which steam methane reforming would be problematical due to its hydrocarbon content or have as its sole object the refining of natural gas or other gas stream having a hydrocarbon content that is completely compatible with conventional steam methane reforming techniques. Other streams to be treated may or may not have an objectionable sulfur content to be removed.

In apparatus 1, a refinery off-gas stream 10, that optionally may be combined with a hydrogen product recycle stream 12, is compressed in a compressor 14 to a pressure of between about 5 psig and about 100 psig above the operating pressure of the process feed to steam methane reformer 52, to be discussed hereinafter. The amount of hydrogen, if any, introduced into refinery off-gas stream 10 will depend on the hydrogen content of refinery off-gas stream 10. In this regard, some refinery off-gas streams have been found to contain sufficient hydrogen for the hydrogenation reactions to be discussed hereinafter. The refinery off-gas stream 10 can be a fluidic catalytic cracker ("FCC") off-gas, a sweet refinery gas, coker off-gas or other type of off-gas containing high amounts of hydrocarbons with more than two carbon atoms. Typically, the refinery off-gas stream will contain no less than about 15% by volume on a dry basis of hydrocarbons with at least two carbon atoms and/or at least about 3% by volume of olefins. The following Table 1 illustrates typical compositions for such streams.

TABLE 1

| | | Gas Composition (mole fraction %) | | |
|---|---|---|---|---|
| | | FCC off-gas | Coker off-gas | SRG |
| Hydrogen | mol % | 10.8 | 26.97 | 17.2 |
| Methane | mol % | 37.7 | 52.8 | 42.1 |
| Ethylene | mol % | 15.9 | 0.6 | 9.8 |
| Ethane | mol % | 15.5 | 8.9 | 19.55 |
| Propylene | mol % | 2.84 | 0.9 | 3.8 |
| Propane | mol % | 1.65 | 3.8 | 1.2 |
| Isobutane | mol % | 0.68 | 0.5 | 0.5 |
| Butane | mol % | 0.20 | 1.3 | 0.1 |
| 1-Butene | mol % | 0.15 | 0.2 | 0.1 |
| 1,3-Butadiene | mol % | 0.01 | 0.2 | 0.19 |
| Isopentane | mol % | 0.28 | 0.3 | 0.5 |
| Pentane | mol % | 0.84 | 0.4 | 0.06 |
| 1-Pentene | mol % | 0 | 0.1 | 0 |
| Hexane+ | mol % | 0 | 0.9 | 0 |
| Nitrogen | mol % | 9 | 0 | 0 |
| Oxygen | mol % | 0.02 | 0 | 0 |
| Carbon Monoxide | mol % | 2.15 | 2.1 | 3.3 |
| Carbon Dioxide | mol % | 2.28 | 0.03 | 1.6 |
| Total | | 100 | 100 | 100 |

Although not indicated in the above Table 1, the sulfur content of such feeds may range between about 5 ppm and about 200 ppm and the sulfur content would be divided between mercaptans, thiophenes, and hydrogen sulfide. The sulfur content of natural gas is typically about 5 ppm.

After compression, the resultant compressed stream 16 is introduced into a known guard bed 18, containing a sorbent, typically iron based, to reduce sulfur species to less than about 25 ppm and heavy metals. It is to be noted that guard bed 18 is not required if the sulfur content is less than about 25 ppm. Alternatively an amine adsorption column can be used or a combination of an amine adsorption column and a sorbent bed. The resulting treated stream 20 is combined with a natural gas stream 22 to produce a feed stream 26. Feed stream 26 preferably has a sulfur content of less than about 25 ppm. Feed stream 26 is preheated in a feed heater 27 to a temperature of no greater than about 600° C. to avoid cracking of higher order hydrocarbons that are contained within feed stream 26. A separate guard bed (not shown) for chloride removal may be included prior to a sulfur removal bed 44 to be discussed hereinafter. The resulting heated feed stream 28 is then introduced into a dual mode catalytic reactor 30, so named in that it contains a catalyst that is capable of promoting both hydrogenation and partial oxidation reactions at operational temperature. As will be discussed, dual mode catalytic reactor 30 can operate in a catalytic hydrogenation mode to at the very least produce saturated hydrocarbons from any olefins present in the feed and/or to reduce sulfur compounds, such as carbonyl sulfide, mercaptans, thiophenes, and other organic sulfur species, to hydrogen sulfide for further treatment. Alternatively, dual mode catalytic reactor 30 can be operated in a catalytic oxidative mode of operation utilizing additional steam and oxygen to provide energy through oxidation for promoting partial reforming within this feed and thereby to increase the amount of hydrogen product that is actually made and also, to chemically reduce the sulfur compounds. The mode of operation of dual mode catalytic reactor 30 is controlled through adjustment of valves 32 and 34 that control the addition of oxygen from an oxygen stream 36 and steam from a steam stream 38, respectively.

During the hydrogenation mode of operation, valves 32 and 34 are generally closed. However, valve 32 may be opened to admit steam to control temperatures within dual mode catalytic reactor 30 as may be necessary to control reaction temperature particularly when refinery off-gas stream has a high content of olefins. As may be appreciated, the steam can be directly added to feed stream 26. During the hydrogenation mode of operation, the hydrogen within heated feed stream 28 and the unsaturated hydrocarbons react to produce saturated hydrocarbons and any remaining sulfur species are chemically reduced to hydrogen sulfide to thereby produce an intermediate product stream 40.

During the catalytic oxidative mode of operation both valves 32 and 34 are opened to produce an oxygen to carbon ratio of less than about 0.25 and a steam to carbon ratio of less than 0.5 within dual mode catalytic reactor 30. The oxygen stream 36 can be air, oxygen enriched air or other oxygen containing gas and preferably is an oxygen enriched stream containing oxygen in an amount of about 85% by volume and greater. This can be done using a sparger or static mixer or a reticulated metallic or ceramic foam monolith. The foam monolith provides a tortuous path that can provide safe and complete mixing of the oxygen at a relatively low pressure drop. The rate of steam addition is important since it helps with reformation of the olefins and other hydrocarbons with more than two carbon atoms. Too much steam is undesirable, however, since remaining steam will negatively impact the ability of the desulfurizer to remove the sulfur. Furthermore, excessive steam will also lower the temperature within dual mode catalytic reactor 30 and prevent the conversion of higher order hydrocarbons to methane, carbon monoxide, hydrogen and etc.

The hydrocarbons contained within heated feed stream 28 are reacted with the oxygen and steam to alternately produce intermediate product stream 40 having a temperature of between about 500° C. and about 860° C. Intermediate product stream 40 has a hydrocarbon content consisting of methane, less than about 0.5% of olefins by volume on a dry basis, less than about 10% of alkanes with two or more carbon atoms on a dry basis, no more than about 1% by volume on a dry basis of hydrocarbons other than alkanes and olefins and a remaining content comprising hydrogen, carbon monoxide, carbon dioxide and water vapor. Additionally, sulfur species are chemically reduced. The hydrogen content of intermediate product stream 40 when produced as a result of the catalytic oxidative mode of reaction is higher than that produced during the hydrogenation mode of operation. At a constant reformer firing rate the intermediate product stream from the catalytic oxidative mode will result in the reformer producing larger volumes of synthesis gas product on a dry basis and, consequently, more hydrogen.

As indicated above, dual mode catalytic reactor 30 contains a catalyst that is capable of promoting both hydrogenation and partial oxidation reactions. Such catalyst is preferably a metallic monolith coated with a catalytic layer that contains a Group VIII catalyst, preferably, platinum, rhodium, palladium, nickel or ruthenium. The structure of the monolith can be reticulated foam, honeycomb or a corrugated foil wound in a spiral configuration. Catalyst coated beads or ceramic monoliths in the form of a reticulated foam or honeycomb structure are other possibilities.

It is believed that the metallic supported catalyst has better performance than other supported catalyst in that it has better heat conductivity, a more uniform temperature profile than other catalyst forms and a lower operating temperature. All of these factors permit the more selective destruction of olefins.

A useful catalyst can be obtained from Sud-Chemie of Louisville, Ky., United States of America, which is in the form of a monolith which is sold as PC-POX 1 on FeCrAlY. Similar catalysts from other suppliers may be used.

The residence times within a reactor having a catalyst capable of both hydrogenation and partial oxidation activity, should be selected to produce space velocities ranging from about 10,000 to about 100,000 hours$^{-1}$. Space velocities below about 10,000 hours$^{-1}$ result in the catalyst not being fully utilized and possibly result in carbon formation for certain feeds. Operations above 100,000 hours$^{-1}$ result in reactor performance for purposes of the invention tending to drop off so that intended conversion rates are difficult to obtain, particularly in the catalytic hydrogenation mode of operation. For such purposes, space velocity is defined as the ratio of the volumetric gas flow rate at standard temperature and pressure divided by the empty reactor volume. It is to be further noted that practically, during turn-down conditions, longer space velocities may be used that are as low as about 10,000 hr.$^{-1}$. Such low space velocity may be required for certain feeds to be treated. It is to be noted that space velocities in the order of 2,000 to 4,000 hr.$^{-1}$ are required for conventional hydrotreaters having conventional hydrotreater catalyst for the conversion of olefins as described above.

Hydrogen is produced in the catalytic oxidative mode in contrast to the hydrogenation mode where it is consumed. More hydrogen/syngas can be produced from a reformer when using a hydrogen containing stream (excluding recycled hydrogen) in the dual mode reactor 30 because fewer hydrocarbons need to be reformed relative to the hydrogen product. For a fixed firing rate, the amount of hydrogen containing gas that can be processed is largely dependent on the hydrogen content of the gas relative to the hydrocarbon content of the gas. For natural gas there is relatively little hydrogen and consequently, natural gas requires more energy to reform per unit of hydrogen produced. In the oxidative mode, increased output can be obtained from streams that contain no hydrogen. If hydrogen recycle is used in the hydrogenation mode the hydrogen recycle can be eliminated when operating in the oxidative mode.

It is to be noted, that another possible mode of operation is to reduce the firing duty of the steam methane reformer to reduce the hydrogen output attributable to steam methane reforming within the reformer itself, for example steam methane reformer 52. This allows less fuel to the reformer to be consumed with hydrogen production being made up in dual mode catalytic reactor 30. Although it is conceivable that the hydrogen production could thus be maintained at a constant level, the exact degree to which this is done depends of course to such economic factors as the cost of oxygen versus natural gas, a typical fuel to the steam methane reformer.

Turning again to FIG. 1, intermediate product stream 40 is then cooled in a heat exchanger 42 that produces steam to be sent to a steam drum 68. Intermediate product stream contains less than about 25 ppm of sulfur species in either the catalytic hydrogen or catalytic oxidative modes of operation. The intermediate product stream 40 is sufficiently cooled within heat exchanger 42 to be introduced into a sulfur removal unit such as a conventional zinc oxide sorbent bed 44 and thereby to form a treated feed stream 46. A possible sulfur removal unit could utilize copper oxide and an amine adsorption column in combination with zinc oxide or copper oxide sorbent is also possible for such purposes although the degree of required cooling would be increased. However, in any sulfur removal unit the sulfur content should be reduced to less than about 0.1 ppm by volume in order to prevent degradation of the reforming catalyst within steam methane reformer 52.

Treated feed stream 46 and a steam stream 48 are combined and introduced as a reformer feed stream 50 into steam methane reformer 52. Steam methane reformer 52 is of conventional design and includes a mixed feed heater 54 that produces a heated reformer feed stream 56 that is introduced into reformer tubes 58. The reformer tubes 58 contain conventional steam methane reforming catalyst. As well known in the art, the endothermic reaction is supported by heat generated by the combustion of a natural gas and PSA (pressure swing adsorption) tail gas stream 60. Such stream could also include refinery off-gases. Combustion of the natural gas and PSA tail gas stream 60 is supported by an air stream 62 that is heated within an air heater 64. If a PSA tail gas stream were not used, process stream 60 would consist of natural gas, refinery gas or a combination of fuels. Boiler feed water is preheated near saturation temperature in boiler feed water heater 66 and added to a steam drum 68 to raise steam in steam boiler 70. The resultant steam stream 72 is further heated in a steam superheater 74 to form steam stream 75. Part of the superheated steam contained within steam stream 75 can be diverted as a stream 76 for export uses. The other portion of steam stream 75 is used to form steam stream 48 that serves as part of the reactant for steam methane reformer 52.

The flue gases produced by the combustion of natural gas and PSA tail gas stream 60, leaving the radiant section 78 of the steam methane reformer 52, are used for heating in the mixed feed heater 54, the steam superheater 74, the steam boiler 70 and the air heater 64. The flue gases after being treated in a known catalytic sulfur removal unit 80 ("SCR") are discharged from stack 82.

A synthesis gas product stream 84 produced by the steam methane reforming reactions within steam methane reformer 52 can be used to produce steam in a process steam boiler 85. Further hydrogen may be produced in a known high temperature shift bed 86 containing a water-gas shift catalyst. The resultant intermediate hydrogen product stream 88 can then be introduced into feed heater 27 for heating of the feed stream 26 and also to heat boiler feed water in boiler feed water heater 66 and a demineralized water heater 92 prior to deaeration (not shown) for use in producing steam.

The intermediate hydrogen product stream 88 is then further cooled in an air/water cooler 94 and introduced into a known pressure swing adsorption apparatus 96 that normally contains adsorption beds that adsorb impurities comprising carbon monoxide, carbon dioxide, methane, nitrogen, and water and thereby produce a hydrogen product stream 98 and a PSA tail gas stream 100. PSA tail gas stream 100 is combined with natural gas to form natural gas and PSA tail gas stream 60. Part of the hydrogen product stream 98 is recycled as a hydrogen recycle stream 12 and combined with feed stream 28 to enable or at least help enable the hydrogenation mode of dual mode catalytic reactor 30. The dual mode reactor can be effectively operated without hydrogen recycle when in the oxidative mode.

As would occur to those skilled in the art, several different modes of operation are possible with respect to apparatus 1. In the illustrated mode, both a refinery off-gas and natural gas are used in forming the feed. Apparatus 1 could equally be used to treat and reform either natural gas alone or a refinery off-gas alone. Additionally, it is also possible to operate apparatus 1 exclusively in either the hydrogenation mode of operation or the catalytic oxidative mode of operation. The hydrogenation mode might be selected where the oxygen expense is not desirable but the elimination of a conventional hydrotreater is attractive. Moreover, such use allows streams having a high olefin content to be utilized without damage to the reforming catalyst within steam methane reformer 52. While such streams may contain an ordinary unacceptable level of higher order hydrocarbons, such as alkanes with two or more carbon atoms, the streams can nevertheless be treated in a steam methane reformer 52 if provided with a catalyst tolerant of such hydrocarbon and/or by slightly increasing the steam to carbon ratio in a manner well known in the art. Another possibility is to adjust the flow of the refinery off-gas 10 during the hydrogenation mode of operation so that the level of such hydrocarbons within the reformer feed stream 50 is in an acceptable low range. At the other extreme, exclusive operations in the catalytic oxidative mode of operation are possible. This would be desirable where high hydrogen production was consistently required. As to this latter point, the following Tables 4 and 5 illustrate a calculated example of the amount of hydrogen production attainable.

The following Table 2 is a calculated example describing key process parameters in apparatus 1 of the use of FCC off-gases and sweet refinery gases as compared with a "Base Case" in which natural gas alone was used to form the synthesis gas product. This table shows the reduction in reformer duty associated with processing the various fuels through the catalytic reactor in the oxidative mode.

TABLE 2

|  |  | Base Case | FCC Gas | SRG |
|---|---|---|---|---|
| Hydrogen production | MMSCFD | 35 | 35 | 35 |
| (natural gas stream 22) | MMBtu/hr | 618 | 302 | 324 |
| (refinery off-gas stream 10) | MMBtu/hr | 0 | 314 | 291 |
| Oxygen Stream 36 | Tons per day | 0 | 27 | 30 |
| Total Steam Stream 75 | Lb/hr | 130,770 | 129,870 | 128,502 |
| Reformer Feed Stream 50 | lbmol/hr | 5773 | 5917 | 5943 |
| Reformer Duty | MMBtu/hr | 134.8 | 124.4 | 121.9 |

(1) "NG" is natural gas.
(2) "ROG" is refinery off-gas.

The following Table 3 illustrates a calculated comparison of the synthesis gas composition leaving the reformer in the cases above.

TABLE 3

| Component | Base Case | FCC Gas | SRG |
|---|---|---|---|
| $H_2O$ | 0.3302 | 0.3068 | 0.3139 |
| $H_2$ | 0.4750 | 0.4619 | 0.4725 |
| $N_2$ | 0.0060 | 0.0142 | 0.0105 |
| CO | 0.0898 | 0.1049 | 0.0970 |
| $CO_2$ | 0.0538 | 0.0601 | 0.0556 |
| $CH_4$ | 0.0452 | 0.0522 | 0.0505 |

Figure 2:
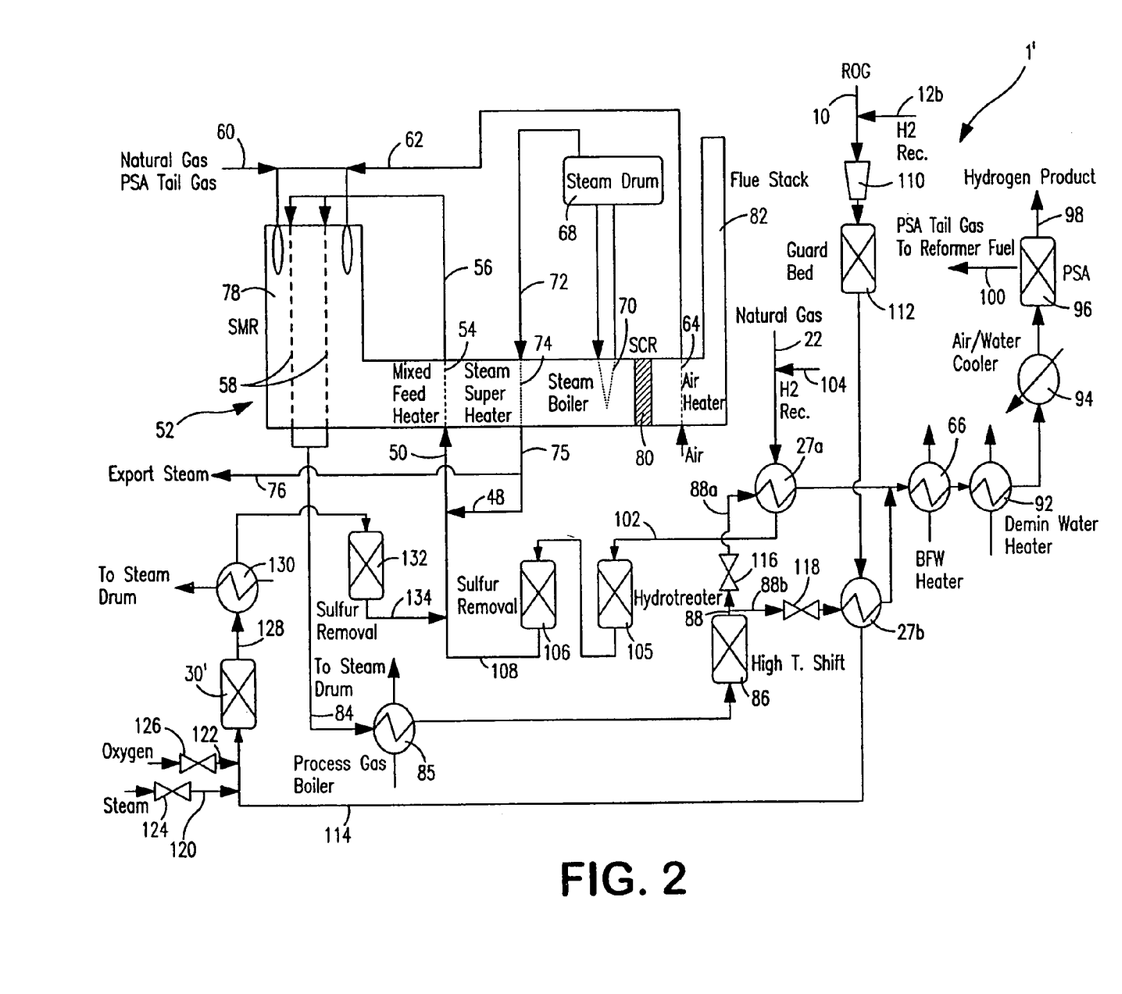
FIG. 2 is an alternative embodiment of FIG. 1 in which the refinery off-gas and the natural gas are separately heated, the refinery off-gas is sent to the dual mode catalytic reactor and the natural gas is sent to a conventional hydrotreater.

With reference to FIG. 2, an Apparatus 1' is illustrated in which the refinery off-gas stream 10 and natural gas stream 22 are separately treated. As would be appreciated by those skilled in the art, Apparatus 1' would have application to a retrofit situation in which an existing feed heater 27a were provided to heat natural gas stream 22 to produce a heated natural gas stream 102. Hydrogen from a hydrogen recycle stream 104 could be introduced into natural gas stream 22 that was derived from hydrogen product stream 98. The heated natural gas stream 102 that can contain the added hydrogen is then treated in a hydrotreater 105, containing conventional nickel-molybdenum or cobalt-molybdenum catalyst, to convert the sulfur content of the natural gas into hydrogen sulfide that can be removed in a chemisorbent bed 106 that contains a conventional zinc oxide catalyst to produce a treated natural gas stream 108.

The refinery off-gas stream 10 is compressed in a compressor 110 and then introduced into a guard bed 112 to remove sulfur and metal species. Hydrogen as necessary can be added to refinery off-gas stream by provision of a hydrogen recycle stream 12b, again derived from the hydrogen product stream 98. The refinery off-gas stream 10 with added hydrogen is then introduced into a feed heater 27b to provide a heated refinery off-gas gas stream 114. Heating within feed heaters 27a and 27b is effected by indirect heat transfer with subsidiary intermediate hydrogen product streams 88a and 88b. The flow rate of such subsidiary streams is controlled by valves 116 and 118. Alternatively, valves 116 and 118 could be eliminated by placing 27a and 27b in series relative to stream 88 leaving the high temperature shift.

The heated refinery off-gas stream 114 forms the feed to then be treated in dual mode catalytic reactor 30' that operates in either a catalytic hydrogenation mode of operation or a catalytic oxidative mode of operation. As in the embodiment of FIG. 1, steam and oxygen streams 120 and 122, respectively, are controlled by valves 124 and 126. The resulting intermediate product stream 128 is then cooled within heat exchanger 130 and treated within chemisorbent bed 132 for removal of hydrogen sulfide. The treated intermediate product stream 134 is then combined with treated natural gas stream 108 and the combined stream is then reformed within steam methane reformer 52 as described with reference to FIG. 1. Alternatively, stream 128 (after cooling) can be mixed with hydrotreater exit stream prior to entering sulfur removal unit 106.

Again, several different modes of operation are contemplated for apparatus 1'. In one mode of operation only natural gas is utilized. In another mode, both natural gas and refinery off-gas are utilized. In yet another mode of operation, only refinery off-gas is utilized. In such cases, valves 116 and 118 are appropriately set to cut off the flow to heat exchangers 27a and 27b, respectively. When refinery off-gas is utilized either exclusively or in combination with natural gas both the hydrogenation and catalytic oxidative mode of operations are contemplated to allow for selective adjustment of the amount of hydrogen produced.

Figure 3:
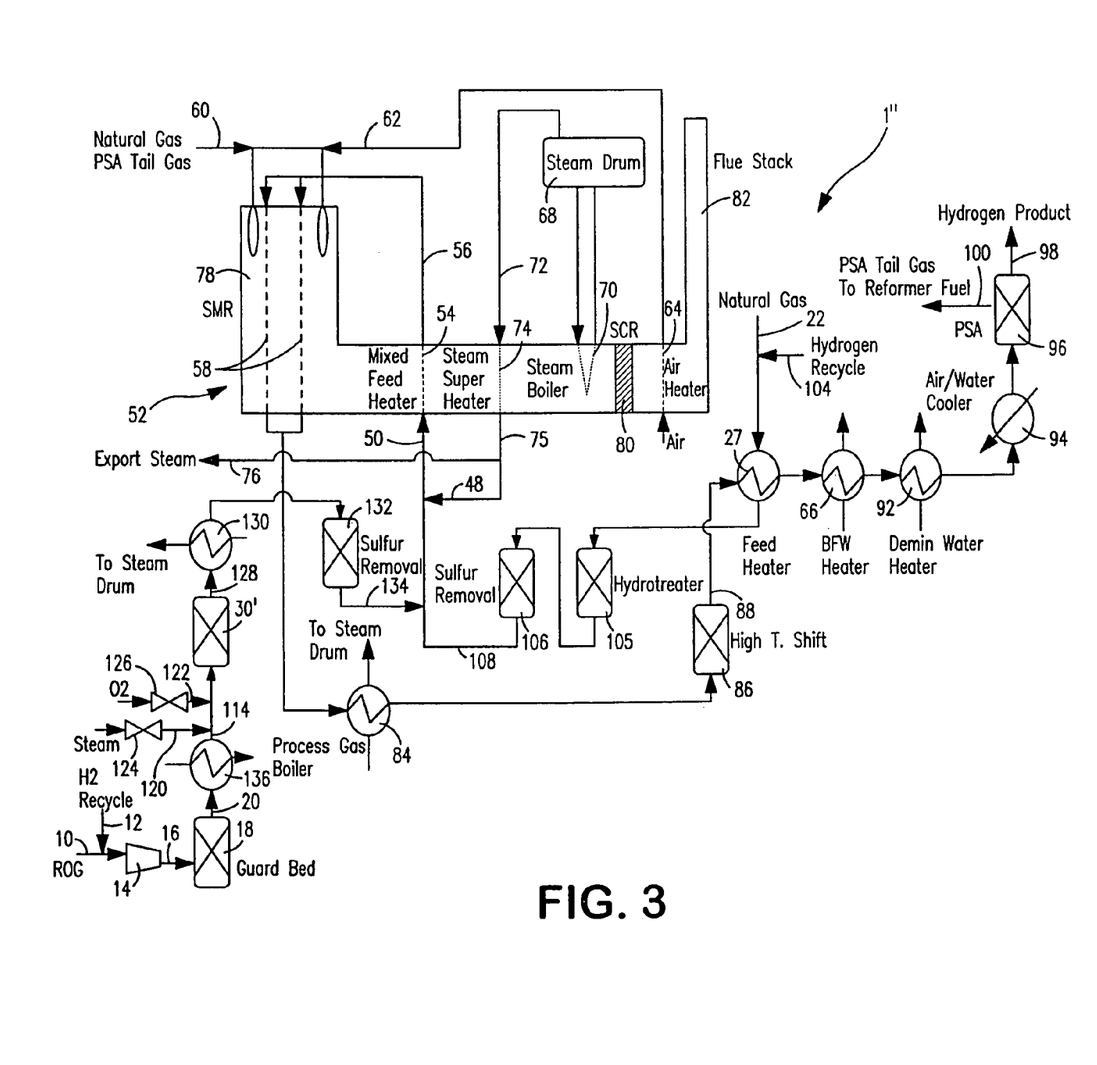
FIG. 3 is an alternative embodiment of FIG. 2 in which the refinery off-gas preheating is performed without direct link to syngas cooling.

With reference to FIG. 3, an Apparatus 1" is illustrated in which a separate feed heater 136 is used to heat treated stream 20 derived from refinery off-gas stream 10 and thereby form heated refinery off-gas stream 114 for treatment within catalytic dual mode reactor 30'. Hence, there is no need for valves 116 and 118 and two feed heaters 27a and 27b. Apparatus 1" otherwise functions in the same manner as the embodiment of FIG. 2.

In all embodiments, where a feed stream is used that contains levels of olefins or higher order hydrocarbons that would be unacceptable to steam methane reformer 52, it is necessary to operate dual mode catalytic reactor 30 or 30' so that reactor feed stream 50 contains acceptable levels of olefins or higher order hydrocarbons. Preferably the acceptable levels are less than about 0.5% by volume on a dry basis of olefins and less than about 10.0% of on a dry basis of alkanes with two or more carbon atoms. Given that the intermediate product streams 40 (FIG. 1) and 128 (FIGS. 2 and 3) can be blended with natural gas, such intermediate product streams 40 and 128 may have concentrations of olefins and alkanes in excess of the foregoing preferred limits.

When dual mode catalytic reactor 30 or 30' is operated in the hydrogenation mode, the operations thereof can be set by considering the amount of hydrogen in the feed stream 26 or heated refinery off-gas 114 stream that will be necessary to reduce the olefin content to a specific level that meets the feed requirements for the steam methane reformer 52, or in other words, less than 0.5% by volume on a dry basis. This is a straightforward chemical calculation that can be made upon an analysis of the feed stream 26 or heated refinery off-gas stream 114 by a gas chromatograph to obtain its composition. A known sampling port could be provided in Apparatus 1, 1', 1" illustrated in the Figures. At the same time, the intermediate product stream 40 or 128 must be above 400° C. to insure sufficient catalytic activity. At one extreme, at a high olefin content, given that the hydrogenation reaction is exothermic, it is relatively easy to meet such temperature requirement. At the other extreme, given a low olefin content, for example, natural gas, more preheating of the feed stream will be necessary. The upper temperature limit for conducting operations in this mode will vary with the feed in that at extremely high temperatures, carbon formation will occur. However, practically, it would not be desirable to conduct such operations at temperatures above 650° C. As such temperature is approached, sufficient heat exists that would be best used for supporting reforming reactions with the addition of steam. Moreover, as such temperature is approached, methane, as opposed to hydrogen, begins to be generated that would in any case increase reforming duty on steam methane reformer 52.

During operations of dual mode catalytic reactor 30 or 30' in the oxidative mode, at temperatures below about 500° C., little appreciable hydrogen will be produced. Above about 860° C., the catalyst life of any partial oxidation catalyst will be compromised and oxygen cost becomes excessive. The temperature can be adjusted by adjustment of the flow rate of the oxygen stream 36 or 122. At the same time, the amount of additional hydrogen produced can be controlled by fine tuning the oxygen to carbon ratio and the steam to carbon ratio given above. The other considerations involve the feed itself, for example, a refinery off-gas stream 10 that contains a high content of higher order hydrocarbons and/or olefins can impact the oxygen to carbon and steam to carbon ratio for a required intermediate product. In any event, in the present invention and with any feed composition, in the catalytic oxidative mode of operation, it is intended for hydrogen conversion to occur without predominantly converting the hydrocarbon content of the feed to hydrogen and carbon monoxide such as would be the case in a conventional partial oxidation reactor in which conversion rates of greater than about 75% are possible. At the given upper limit of the ratios, set forth above, at the maximum temperature of 860° C., such operation will be insured with any feed or in other words, the higher order hydrocarbon content will substantially be reduced to methane, hydrogen and carbon monoxide. For the specific refinery-off gas streams set forth in Table 1, above, at such upper limit, the olefin content and/or the higher order hydrocarbon content will be adjusted down to the limits of operation for a feed to steam methane reformer 52, namely below about 0.5% by volume on a dry basis for the olefins and below about 10% by volume on a dry basis of the alkanes not including methane. However, fine tuning of the actual ratios used given a particular composition of feed stream 26, again, determined through gas chromatography, can be set by known chemical reaction calculations to conserve oxygen. Further adjustment can be made by determining the composition of the intermediate product streams 40 and 128 by gas chromatography. It is to be pointed out that where an intermediate product stream, such as 128, is blended, the olefin and alkane content of the intermediate product stream 128 may be above the aforesaid limits so long as reformer feed stream 50 is within the limits as a result of blending.

For a given hydrogen product 98 rate and a constant steam methane reformer 52 firing rate, a certain amount of refinery off-gas stream 10 is required. However the composition of the refinery off-gas stream 10 can be changing due to variations in the processes that produce ROG in the refinery. Such variations can be monitored and controlled with a gas chromatograph and a calorimeter. The gas chromatograph can monitor composition changes but it has a slow response of 5–10 minutes for analysis of a gas stream that contains hydrocarbons with 1–6 carbon atoms. The calorimeter can measure the heating value of the gas and also it can measure its specific gravity with a densitometer that is typically included with the calorimeter. The calorimeter has a very fast response time of 3–30 seconds. In order to maintain a constant hydrogen production rate at the same reformer firing rate the composition of the refinery off-gas stream 10 must be known. Variations in the feed composition to the dual mode catalytic reactor 30, 30' can be monitored with the calorimeter and flow can be adjusted so that the intermediate product stream is consistent with hydrogen product 98 requirements. If the composition changes, for example, due to a hydrogen spike in the refinery off-gas stream 10, the ensuing drop in calorific value will be detected by the calorimeter and the flow to dual mode catalytic reactor 30, 30' will be increased so that the flow of syngas from unit 88 is held consistent with hydrogen production rate 98. Integrated computer controls will set reformer firing rate and other parameters in response to variation in feed. The opposite reaction is expected if the hydrogen content is reduced. In that way the calorimeter can provide instantaneous response to feed composition variations. The actual composition can be measured with the gas chromatograph at longer intervals and further adjustments to the flow to the reactor can be made based on the desired hydrogen output and other hydrogen plant parameters with a model predictive control system.

In addition for stable operation of the catalyst and the hydrogen plant as indicated above, it is desirable to maintain the temperature of the intermediate product stream 40, 128 emanating from dual mode catalytic reactor 30, 30' within at least a stable temperature range. In the hydrogenation mode, olefin concentration increases will lead to temperature increases. Such temperature increases can be tempered by adding steam to the feed stream of the dual mode catalytic reactor 30, 30'. The steam has a heat capacity that will reduce temperature excursions by adsorbing some of the heat released by the exothermic reaction. The steam also will participate in endothermic reforming reactions that can help maintain the reactor exit temperature within a specific operating window. Too much steam though is undesirable because it constrains the ability of the sulfur removal unit 44 and 132 to reduce sulfur below 0.1 ppm. The steam addition must be limited to below 10% at the dual mode reactor exit. In the oxidation mode, both oxygen and steam are added to the feed of the dual mode catalytic reactor. The amount of oxygen added depends on the desired hydrogen production increase and typically the need to control olefins below 0.5% at the entrance of the reformer. The amount of oxygen, steam, refinery off-gas stream 10 flow, the refinery off-gas composition and the degree of preheating determine the reactor exit temperature. For a desired hydrogen production increasing the flow of oxygen can be regulated to keep the dual mode catalytic reactor 30, 30' exit temperature constant. If the dual mode catalytic reactor 30, 30' exit temperature increases, then oxygen can be reduced to reduce the temperature and if exit temperature decreases oxygen can be increased to maintain the exit temperature in a narrow range typically with 10 to 20 degrees. Maintaining the exit temperature constant also has the benefit of regulating the composition at the exit of the dual mode catalytic reactor 30, 30' so that the reformer feed stream 50 sent to the steam methane reformer 52 has a more uniform composition. The more uniform intermediate feed composition allows the reformer to operate at a stable firing duty and stable hydrogen production capacity.

While the invention has been described with reference to a preferred embodiment as will occur to those skilled in the art, numerous changes, additions and omissions may be made without departing from the spirit and scope of the present invention.

What is claimed is:

1. A steam methane reforming method comprising:
    heating a feed stream comprising olefins and hydrogen to a temperature of no greater than about 600° C.;
    contacting the hydrogen and the olefins within the feed stream with a catalyst capable of promoting both hydrogenation and partial oxidation reactions and catalytically reacting said hydrogen with the olefins without adding oxygen to produce an intermediate product stream containing saturated hydrocarbons formed from hydrogenation of the olefins, the heating of the feed stream being sufficient and/or the olefins being present within the feed stream at a sufficient concentration that the intermediate product stream is produced at a temperature of greater than about 400° C.; and
    reacting a reformer feed stream formed at least in part by the intermediate product stream and a steam stream in a steam methane reformer to obtain a synthesis gas product stream having more moles of hydrogen than that of the feed stream and also containing carbon monoxide, water and carbon dioxide;
    the catalytic reaction of the hydrogen and the olefins being conducted within a reactor containing the catalyst at a space velocity of greater than about 10,000 hr$^{-1}$ and with a sufficient amount of hydrogen such that the reformer feed stream has an olefin content of less than about 0.5% of olefins by volume on a dry basis.

2. The method of claim 1, wherein:
    the feed stream also comprises sulfur compounds;
    the hydrogen also reacts with the sulfur compounds during the catalytic reaction such that the intermediate product stream also contains hydrogen sulfide formed from the hydrogenation of the sulfur compounds;
    the intermediate product stream is cooled and treated to remove the hydrogen sulfide such that the intermediate product stream contains no more than about 0.1 ppm hydrogen sulfide after having been treated; and
    the reformer feed stream is formed at least in part by the intermediate product stream after having been treated.

3. The method of claim 1, wherein the olefins are present within the feed stream in an amount no less than about 3% by volume on a dry basis.

4. A steam methane reforming method comprising:
    heating a feed stream comprising no less than about 15% by volume on a dry basis of hydrocarbons with at least two carbon atoms and/or at least about 3% by volume of olefins to a temperature of no greater than about 600° C.;
    contacting the hydrocarbons and/or the olefins contained within the feed stream, and also, oxygen and steam with a catalyst capable of promoting both hydrogenation and partial oxidation reactions and catalytically reacting and hydrocarbons and/or olefins, steam and oxygen at an oxygen to carbon ratio of less than about 0.25 and at a steam to carbon ratio of less than about 0.5 to produce an intermediate product stream; and
    reacting a reformer feed stream, formed at least in part by the intermediate product stream and a steam stream, in a steam methane reformer to obtain a synthesis gas product stream having more moles of hydrogen than that of the intermediate product stream and also containing carbon monoxide, water and carbon dioxide;
    the catalytic reaction being conducted within a reactor containing the catalyst at a space velocity greater than about 10,000 hr$^{-1}$, with a sufficient amount of oxygen that the intermediate product stream is produced at a temperature of between about 500° C. and about 860° C. and with the oxygen to carbon and steam to carbon ration being selected that the reformer feed stream has a hydrocarbon content consisting of methane, less than about 0.5% of olefins by volume on a dry basis, less than about 10% of alkanes with two or more carbon atoms by volume on a dry basis, no more than about 1% by volume on a dry basis of hydrocarbons other than alkanes and olefins and a remaining content comprising hydrogen, carbon monoxide, carbon dioxide and water vapor.

5. A steam methane reforming method comprising:
    heating a feed stream comprising hydrocarbons, sulfur compounds and hydrogen to a temperature of no greater than about 600° C.;
    producing an intermediate product stream by catalytically reacting said hydrogen with the hydrocarbons and the sulfur compounds without oxygen so that the intermediate product stream contains saturated hydrocarbons and hydrogen sulfide formed from hydrogenation of the hydrocarbons and the sulfur compounds, respectively, the heating of the feed stream and/or the hydrogenation of the hydrocarbons being sufficient to produce the intermediate product stream at a temperature of greater than about 400° C. or alternatively, catalytically reacting oxygen, steam and the hydrocarbons, the hydrogen and the sulfur compounds contained within the feed stream so that the intermediate product stream contains additional hydrogen and carbon monoxide produced by reaction of the oxygen, steam and hydrocarbons and hydrogen sulfide produced by conversion of the sulfur compounds, the oxygen being present in a sufficient amount that the intermediate produced stream is produced at a temperature of between about 500° C. and about 860° C. and at steam to carbon and oxygen to carbon ratios being selected to control an amount of moles of the additional hydrogen produced and at less than about 0.5 and less than about 0.25, respectively;
    the catalytic reactions of the hydrogen, hydrocarbons and the sulfur compounds or alternatively, of the oxygen, steam, hydrocarbons and sulfur compounds, being conducted through contact with a catalyst capable of promoting both hydrogenation and partial oxidation reactions within a reactor that is the same for both of the catalytic reactions, and the catalytic reactions being conducted at a space velocity greater than about 10,000 hr$^{-1}$;

cooling said intermediate product stream;

treating said intermediate product stream by removal of the hydrogen sulfide and such that the intermediate product stream contains no more than about .1 ppm hydrogen sulfide after having been treated; and reacting a reformer feed stream, formed at least in part by the intermediate product stream and a steam stream in a steam methane reformer to obtain a synthesis gas product stream having more moles of hydrogen than that of the feed stream and the intermediate product stream and also containing carbon monoxide, water and carbon dioxide.

6. The method of claim 5, wherein:

the feed stream contains no less than about 15% by volume on a dry basis of hydrocarbons with at least two carbon atoms and/or at least about 3% by volume of olefins;

during the catalytic reaction of the hydrogen, the hydrocarbons and the sulfur compounds, the hydrogen also reacts with any of the olefins present within the feed stream to also produce saturated hydrocarbons and there exists sufficient hydrogen to obtain an olefin content within the reformer feed stream that is less than about 0.5% by volume on a dry basis;

the catalytic reaction of the oxygen, steam, hydrocarbons and sulfur compounds, is conducted with oxygen to carbon and steam to carbon ratio selected so that a hydrocarbon content consisting of methane, less than about 0.5% of olefins by volume on a dry basis, less than about 10% of alkanes with two or more carbon atoms on a dry basis and no more than about 1% by volume on a dry basis of hydrocarbons other than alkanes and olefins is obtained within the reformer feed stream.

7. The method of claim 5 or claim 6, wherein during both of the catalytic reactions, the steam methane reformer is operated at a firing rate that remains substantially unchanged so that the additional hydrogen produced during the catalytic reaction of the oxygen, steam, hydrocarbons and sulfur compounds increases the moles of hydrogen within the synthesis gas product stream over that produced when the hydrogen, hydrocarbons and sulfur compounds are catalytically reacted without adding oxygen.

8. The method of claim 5 or claim 6, wherein during the catalytic reaction of the oxygen, steam, hydrocarbons and sulfur compounds, the steam methane reformer is operated at a lower firing rate than during the catalytic reaction of the hydrogen, hydrocarbons and sulfur compounds.

9. The method of claim 1 or claim 5 or claim 6, further comprising introducing steam into the reactor during the catalytic hydrogenation mode of operation to engage in reforming reactions with the hydrocarbons and thereby to form yet additional hydrogen and carbon monoxide in the intermediate product stream.

10. The method of claim 1 or claim 2 or claim 4 or claim 6, wherein:

hydrogen is added to a natural gas stream and the natural gas stream is treated by hydrogenating the sulfur compounds contained therein into hydrogen sulfide and by removing the hydrogen sulfide so that the natural gas stream contains less than about 0.1 ppm by volume on a dry basis of hydrogen sulfide after having been treated; and the reformer feed stream is formed in part by combining the natural gas stream with the intermediate product stream.

11. The method of claim 1 or claim 2 or claim 4 or claim 6 wherein the feed stream further comprises natural gas.

12. The method of claim 4 or claim 6, wherein said feed stream is an FCC off-gas, a coker off-gas, or a sweet refinery gas.

13. The method of claim 1 or claim 2 or claim 4 or claim 5 or claim 6, wherein said feed stream is compressed to a pressure of between about 5 psi and about 100 psi above operating pressure of the steam methane reformer.

14. The method of claim 1 or claim 5 or claim 6 wherein the feed stream has a sulfur content of less than about 50 ppm.

15. The method of claim 1 or claim 4 or claim 5 or claim 6, wherein the catalyst is a Group VIII metal catalyst supported on a metallic monolith.

16. The method of claim 1 or claim 4 or claim 5 or claim 6, wherein the intermediate product stream is treated by being contacted with a zinc oxide or copper oxide sorbent.

* * * * *

UNITED STATES PATENT AND TRADEMARK OFFICE
CERTIFICATE OF CORRECTION

| | |
|---|---|
| PATENT NO. | : 7,037,485 B1 |
| APPLICATION NO. | : 11/151223 |
| DATED | : May 2, 2006 |
| INVENTOR(S) | : Drnevich et al. |

Page 1 of 1

It is certified that error appears in the above-identified patent and that said Letters Patent is hereby corrected as shown below:

In claim 4, line 11, please replace "reacting and hydrocarbons" to --reacting the hydrocarbons--.

Signed and Sealed this

Eighteenth Day of July, 2006

JON W. DUDAS
*Director of the United States Patent and Trademark Office*